May 24, 1949.　　　　E. W. FORKNER　　　　2,471,029.
PORTABLE WELDER

Filed June 19, 1947　　　　　　　　　　2 Sheets-Sheet 1

INVENTOR.
Ewell W. Forkner
BY Zugelter & Zugelter
Attys.

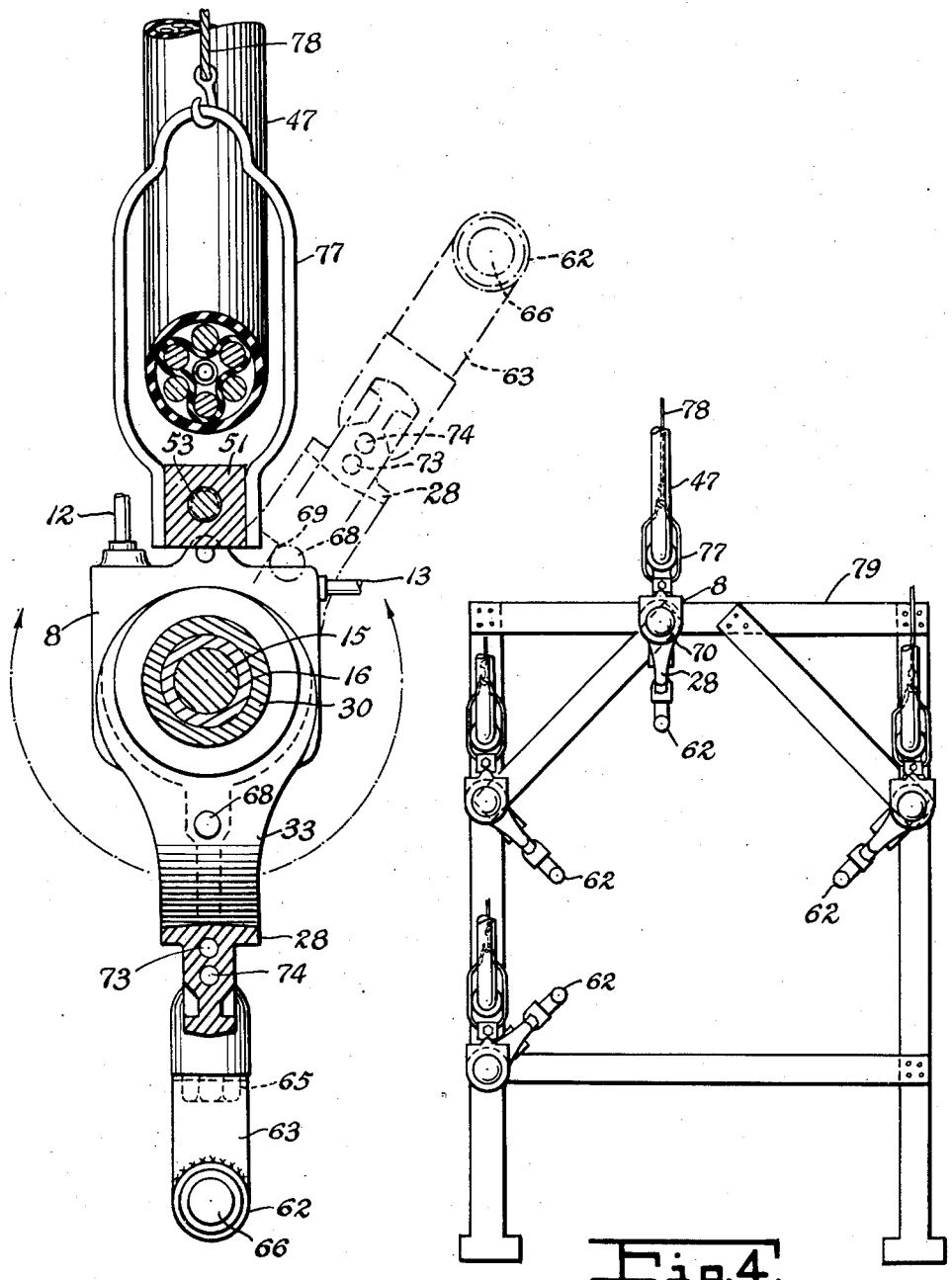

Patented May 24, 1949

2,471,029

UNITED STATES PATENT OFFICE 2,471,029

PORTABLE WELDER

Ewell W. Forkner, Cincinnati, Ohio

Application June 19, 1947, Serial No. 755,665

3 Claims. (Cl. 219—4)

This invention relates to a portable welder of the type commonly called a welding gun, such as is used for performing spot welding operations.

One of the objects of the invention is to provide in a portable welder, greatly improved means for applying welds to work pieces at locations which generally are accessible only with considerable difficulty.

Another object is to provide means whereby an operator may perform difficult spot welding operations at a minimized rate of body fatigue.

Another object is to provide means whereby spot welding operations may be accelerated with a consequent increase in production and quality workmanship, with a saving of cost in time and labor.

A further object of the invention is to provide a device of the character described which can be fabricated at a cost substantially the same as that of less desirable portable welders, and which is characterized by greater durability and dependability of service.

These and other objects and advantages are attained by the means described in the following specifications and illustrated upon the accompanying drawings in which:

Fig. 2 is a cross-sectional view of the welder, taken on the irregular line 2—2 of Fig. 1.

Fig. 4 is a view showing various applications of the welder upon a work piece of a type which is difficult to weld.

In the performance of certain welding operations, such as spot welding large metal frames and other objects too cumbersome to convey to a stationary welding machine, a portable welder or welding gun is generally used. In the past, such welders offered objectionable limitations, requiring the manual positioning of the heavy welding gun at various angles for accessibility to hard-to-get-at parts of the work piece, at a cost of great body exertion on the part of the operator, with a consequent decrease in production and quality of workmanship.

In accordance with the present invention, it is no longer necessary to position the entire welding gun at various angles for accessibility to parts of the work piece. The main body of the gun may be held substantially vertical in counter-weighted suspension, while a swivel mounted yoke, carrying a welding electrode, may be easily swiveled to any angular position within an arc of substantially three hundred degrees.

Figure 1:
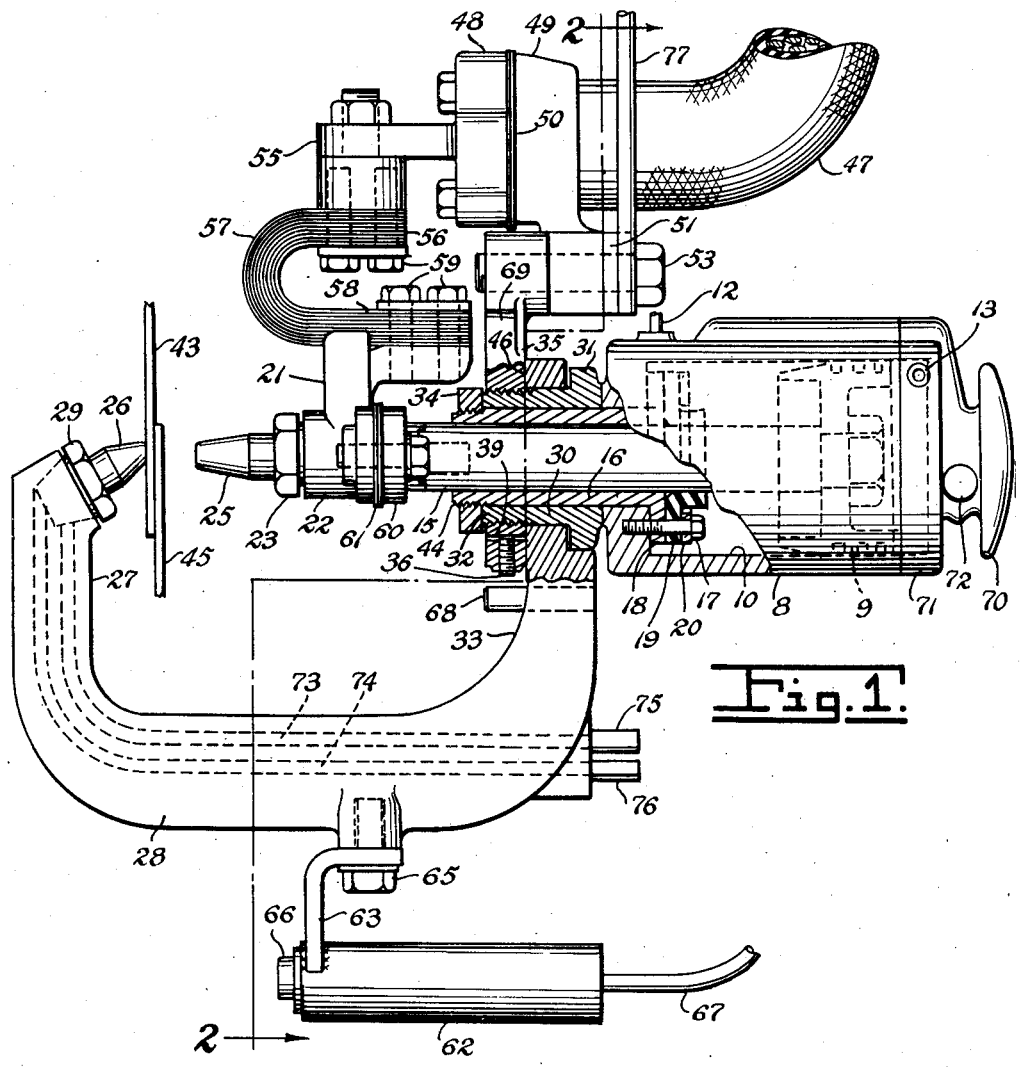
Fig. 1 is a side elevational view, partly in cross-section, of the welder of the present invention.

Referring to the drawings, the character 8 in Fig. 1 indicates a cylinder body which houses a piston 9 for reciprocable movement within the cylinder bore 10. The reciprocating means may be fluid under pressure, such as a gas or a liquid, as common practice may dictate, suitable ports 12 and 13 being provided on the cylinder body for the introduction and exhaust of said fluid.

A piston rod 15 is suitably secured in axial alignment with the piston 9 for reciprocation therewith upon action of the fluid under pressure in the cylinder body. The piston rod 15 is slidably mounted in the piston rod bushing 16, which extends longitudinally from the cylinder body 8, and which may be secured therein by means of screws 17 extending through a flange 18 of the bushing into the adjacent head of the cylinder body. Fluid pressure leakage along the rod 15 may be precluded by means of a suitable packing ring 19 secured against displacement by a ring 20 held in place by the aforementioned screws.

To the outer end of the piston rod 15 is attached a bus lead clamp 21 provided with a substantially cylindrical portion 22 in axial alignment with the piston rod 15. The cylindrical portion 22 is axially tapped for threaded engagement with the electrode adapter 23, said adapter being provided with a tapered bore for frictional engagement with a welding electrode 25. The electrode 25 is in substantial alignment with the tip of a co-operating electrode 26 carried by the free arm 27 of the swivel yoke 28 of substantially C-shape. The electrode 26 may be in frictional engagement with a tapered bore provided in the electrode adapter 29 threaded into the upper portion of yoke arm 27.

Upon the piston rod bushing 16 is mounted the bearing bushing 30, provided with a flange or shoulder 31 and an exteriorly threaded end portion 32, the outer face of the flange 31 being in substantial abutting relation with the inner end wall of the cylinder body 8.

The arm 33 of the swivel yoke 28 is provided with a bore or journal for rotatably mounting or journalling said yoke upon the bearing bushing 30, said bore being in substantial axial alignment with the tip of the electrode 26. The yoke 28 is precluded against displacement from the bearing bushing 30 by means of a lockable connector 35 in threaded engagement with the threaded portion 32 of the bearing bushing, and locked against rotation thereon by means of the set screw 36, while the bearing bushing 30 is precluded against displacement from the piston rod bushing by means of the nut 34 drawn tight upon the threaded end portion 44 of said piston rod bushing.

Figure 3:
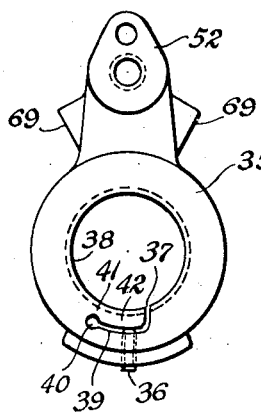
Fig. 3 is a plan view of a lock nut connector which forms a detail of the invention.

Novel means for locking the connector 35 to the bearing bushing have been incorporated, as illustrated in Fig. 3, which shows a plan view of the connector. A slot 37 has been provided, said slot transversely bisecting the internal threaded portion 38 and extending substantially radially thereto, then following a line substantially concentric with the threads as at 39, and terminating at an aperture 40, thereby providing a weakened neck portion 41. The set screw 36, threaded into a radially tapped hole directed toward the partially severed tongue portion 42, will, upon being drawn tight, force said tongue portion against the cooperating threaded portion 32 of the bearing bushing, thereby effecting a binding action upon the threads to preclude rotation of the bearing bushing. The weakened neck portion 41 possesses sufficient flexibility and resiliency to permit movement or radial deflection of the portion 42 under the force of the set screw 36.

A sufficient amount of clearance between the bearing bushing flange 31 and the lockable connector is provided to permit normally a free swiveling motion of the yoke 28. The yoke is therefore rotatable to any angle relative to the piston rod within specified limits, but may be automatically locked at any selected angle by direct welding pressure upon advancement of the electrode 25 against the work pieces 43—45 and the electrode 26. The yoke obviously will be held locked until the electrode 25 is retracted after a spot welding operation. The pressure applied to the electrode 25 by means of the piston 9, against the electrode 26 carried by the yoke 28 is so great as to frictionally bind the face 46 of the yoke against the connector 35, thereby to preclude relative movement of these parts during the welding operation. After the welding operation is completed, the yoke is again free to rotate to any selected angle for the next operation, due to the release of pressure resulting from retraction of piston 9.

Electric current may be supplied to the welder by means of a flexible cable 47, such as the Rees Kickless Cable, covered by patents, including Patent No. 2,308,673, and forming no part of the present invention. The cable includes conductors of opposite polarity suitably connected to two terminal heads 48 and 49, separated by an insulator gasket 50. The terminal head 49 is provided with a depending lug 51, to which is fixed the upper portion 52 of the lockable connector 35 by means of the screw 53. Current flows to the electrode 26 from the terminal head 49, through the connector 35 and the yoke 28, as all of these parts are of electrically conductive metal.

A terminal lug 55 extends laterally from the terminal head 48, to which is secured one leg 56 of a substantially U-shaped flexible laminated bus lead 57. The opposite leg 58 of the bus lead is secured to the bus lead terminal 21. Means, such as the screws 59, are provided for securing the legs of the bus lead to their respective terminals. The bus lead terminal is insulated against the piston rod end member 60 by means of an insulator gasket 61. As will be understood, current is supplied directly to the electrode 25 through the flexible laminated bus lead 57.

Thus it will be seen that as the electrode 25 is advanced to contact the work pieces 43—45, the bus lead flexes sufficiently to permit such advancement of the electrode 25.

Gripping means in the form of a handle 62 may be provided upon the yoke 28 for convenience in guiding said yoke to any selected angular position, said handle being attached to the yoke in any suitable manner, as by means of an angle member 63 welded to the handle and secured to the yoke by the screw 65. Means for initiating operation control mechanism of the welder may be provided on or within the handle 62, such as the electric push button switch 66 in communication with the usual control mechanism through the conductor 67. The outer end of the cylinder body 8 may also be provided with gripping means, such as the knob 70 upon the cover member or head 71 of the cylinder body. A control switch 72 may be provided in conjunction with the knob 70, as an alternate to the switch 66 on handle 62.

An insulated stop pin 68 (Fig. 2), extending outwardly from the inner face of the yoke leg 33, may be provided to limit rotation of the yoke about the bearing bushing 30 by abutment against stop lugs 69 provided on opposite sides of the connector 35. The swing of the yoke is considerable, as hereinbefore stated.

Means for water cooling the electrodes may be provided, such as the channels 73—74 formed in the yoke 28, suitable tubing being attached to the inlet and outlet ports 75—76 for directing a flow of water to and from the electrode 26. Similar water connections may be applied in conjunction with the electrode 25, but since the water cooling means forms no part of the invention, such need not be detailed here.

Means for supporting the portable welder for convenience in handling may be provided, such as the hanger 77, shown in Fig. 2. This hanger may be of any suitable type sturdy enough to support the welder. Supporting means may include a counterweight for easy raising and lowering of the welder, for operating upon different parts of the work piece at various elevations thereon.

As shown in Fig. 4, the rotating flexibility of the swivel yoke is readily apparent to anyone skilled in the art of welding. It will be noted that the main body of the portable welder remains in a substantially vertical position upon its counterweighted support cable 78 or the like, while the yoke 28 is easily swiveled by the operator to various angles in performing spot welding operations upon a frame such as 79. The operator swivels the yoke with one hand while simply guiding the welder body with the other, an operation requiring very little effort on the part of the operator. It is no longer necessary to swing the entire welder to various angles in order to gain access to angular parts of a work piece, thus relieving the operator of considerable exertion and reducing body fatigue. The saving of time and labor effected in properly locating the electrodes for each welding operation, will readily be appreciated.

It is to be understood that various structural changes and modifications may be made within the scope of the appended claims, without departing from the spirit of the invention.

What is claimed is:

1. An electric welder of the gun type comprising a cylinder having a reciprocating piston therein, said cylinder being provided with ports for alternately admitting fluid pressure to the respective ends of the cylinder to drive the piston in forward and reverse directions, a piston rod for said piston extending through the forward end of said cylinder and projecting beyond the same, a sleeve bearing for said piston rod projecting from the forward end of said cylinder, a bushing on said sleeve, a suspension member attached to and embracing said bushing, a swivel yoke of substantially C-shape having one end journaled on said bushing between said suspension member and said cylinder, the other end of said yoke being provided with an electrode in substantial alignment with the longitudinal axis of said piston rod, the adjacent surfaces of said suspension member and the journaled end of the yoke being parallel and adapted to be abutted into firm electrical contact, an electrode attached to but insulated from the free end of said piston rod, an overhead support attached to said suspension member, said support being provided with electric current input conductors, an electrical connector connected to one of said input conductors and to the piston rod electrode, means electrically connecting another of said input conductors to said suspension member whereby the electrode on said yoke is connected through said yoke and bushing to said suspension member, the journal of said yoke and said suspension member being forced into firm positive electrical contact and also locking said yoke against rotation on said bushing when fluid pressure is applied to the cylinder to move said piston forward to engage work pieces disposed between said electrodes.

2. A welder such as set forth in claim 1 characterized by the fact that the connector connecting said piston rod electrode and one of said input conductors is a resilient laminated conductor of substantially U-shape.

3. A welder such as set forth in claim 1 characterized by the fact that the suspension member embracing the bushing is provided with means for securing the one to the other to prevent relative movement between them in response to turning of the swivel yoke about the bushing when the piston is retracted.

EWELL W. FORKNER.

REFERENCES CITED

The following references are of record in the file of this patent:

UNITED STATES PATENTS

| Number | Name | Date |
| --- | --- | --- |
| 2,086,784 | Taylor | July 13, 1937 |
| 2,293,338 | Harris | Aug. 18, 1942 |